United States Patent [19]

Chubb

[11] 4,094,738

[45] June 13, 1978

[54] NUCLEAR FUEL PELLET DESIGN TO MINIMIZE DIMENSIONAL CHANGES

[75] Inventor: Walston Chubb, Franklin Township, Westmoreland County, Pa.

[73] Assignee: Westinghouse Electric Corp., Pittsburgh, Pa.

[21] Appl. No.: 687,838

[22] Filed: May 19, 1976

[51] Int. Cl.² .............................................. G21C 3/06
[52] U.S. Cl. ...................................... 176/67; 176/89; 264/0.5
[58] Field of Search ............................ 176/67, 68, 89; 264/0.5; 252/301.1 R

[56] References Cited

U.S. PATENT DOCUMENTS

| 3,376,201 | 4/1968 | Bain | 176/67 |
| 3,661,709 | 5/1972 | Chubb et al. | 176/67 X |
| 3,689,428 | 9/1972 | Pechin et al. | 176/89 X |
| 3,728,274 | 4/1973 | Gerontopoulos et al. | 264/0.5 X |
| 3,833,470 | 9/1974 | Gyarmati et al. | 176/67 X |
| 3,883,623 | 5/1975 | Lay | 264/0.5 |

Primary Examiner—Peter A. Nelson
Attorney, Agent, or Firm—J. R. Campbell; Z. L. Dermer

[57] ABSTRACT

An improved nuclear fuel composition characterized as a mixture of the dioxide of uranium and plutonium with pores of specified sizes and volumes of each size. The volume of pores of each size are adjusted so that as each group of pores of each size is removed by the nuclear fission induced process of densification, the volume removed is balanced by the volume added by the nuclear fission induced process of solid state swelling. This fuel composition is dimensionally stable in-pile to high burnups because the rate of pore removal is matched to the rate of swelling.

7 Claims, 1 Drawing Figure

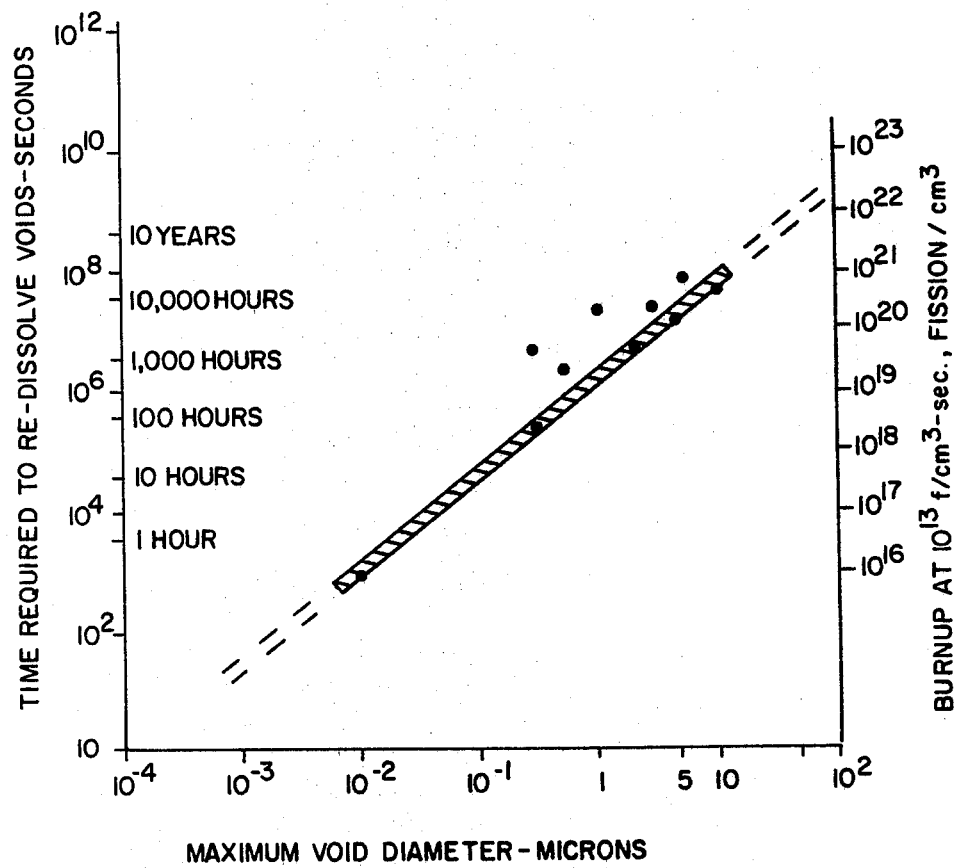

NUCLEAR FUEL PELLET DESIGN TO MINIMIZE DIMENSIONAL CHANGES

BACKGROUND OF THE INVENTION

The invention described herein relates to nuclear fuel and more particularly to an improved design of nuclear fuel pellet which densifies and increases in size at substantially the same rates while undergoing a fission process in a nuclear reactor.

The typical fuel rod used in commercial nuclear reactors measures about 8 to 14 feet in length and contains multiple fuel pellets, each being about 0.60 inch long by 0.366 inch diameter. As manufactured, these pellets are porous and the void spaces therein are called pores. During reactor operation, the fuel pellets are irradiated and produce fission products which cause the pellets to swell. In some cases, such swelling can place strains sufficiently great on the fuel rod walls as to cause the fuel rod to fracture or fail and release radioactive particles to the reactor coolant. On the other hand, the fuel pellets may also densify as a result of dispersion of individual pores by the fission process, and as a result of the migration of the products of dispersion (vacancies) to pellet boundaries. This action creates voids in the fuel pellet column that may cause reactivity changes, heat transfer problems or radial collapse of the fuel rod, all of which will adversely affect reactor operation. This invention deals with the steps which may be taken to eliminate or substantially reduce fuel pellet swelling and densification by balancing one against the other. The circumstances which give rise to the densification-swelling problem show that the problem can be eliminated by taking special care during the fuel pellet manufacturing operation.

When ceramic nuclear fuel pellets are prepared by pressing and sintering of powders, the product invariably contains more or less residual porosity. Little effort has been directed toward removing this residual porosity because of a wide-spread belief in the industry that porosity in nuclear fuel pellets is somehow useful in retarding the swelling that results from the accumulation of the new, extra atoms that are produced by the fission of one uranium atom into two fission product atoms. These extra atoms almost invariably come to rest within the body of the nuclear fuel and increase its volume slowly and inexorably.

In the absence of any real evidence, it has been assumed that all porosity in a ceramic nuclear fuel pellet is used to reduce swelling, and that no net swelling is possible until all the porosity is consumed. This belief is evident in the calculations of fuel swelling made by others working in the art. It also has been generally assumed that the replacement of pore volume by fission product volume takes place by some unknown mechanism on a one for one basis. As a logical consequence, it has been assumed that all that is necessary to increase the burnup, i.e., the number of fission events that can be accumulated before the fuel pellet begins to swell and thus increase its outer dimensions, is to increase its initial porosity. This widespread and general belief led to fuel pellet designs of lower and lower density until recently when it was discovered that low density fuel pellets were densifying inreactor at low burnups and at low temperatures. Studies show that sufficient porosity is removed early in the irradiation history of a low density fuel pellet to increase its density. Such behavior shows that the replacement of pore volume by swelling does not take place on a one for one basis and, unless a reasonable balance exists between pore volume and swelling, swelling will predominate later in the life of the fuel and cause fuel rods to fail structurally and detrimentally affect reactor operation. These studies further led to the realization that pores do not interact mechanically, directly and instantaneously with fission product atoms. Any interaction that takes place must be the result of a complex sequence of events. Such considerations led to more extensive studies of the processes of pore removal, and of swelling, as two separate and distinct processes, and these concepts form the basis of this disclosure.

SUMMARY OF THE INVENTION

Briefly stated, the above disadvantages of the prior art are overcome by providing an improved nuclear fuel composition of uranium and plutonium dioxide made to contain pores of different sizes and volumes in each size. The uranium and plutonium ceramic material before sintering is chosen to have particle sizes which provide pores in the sintered material having diameters which vary in the sintered materal from 0–2 microns to more than 40 microns. The volume of pores in each general size group may therefore vary somewhat and the number of size groups existing in the material need not be precisely the same for all pellets. The maximum desirable volume of pores will range up to about 10% of the total volume with the remainder comprising the dioxide of uranium and plutonium. The minimum desirable volume of pores is set at 1% for each atom percent of intended burnup of uranium atoms.

BRIEF DESCRIPTION OF THE DRAWINGS

While the specification concludes with claims particularly pointing out and distinctly claiming the subject matter of this invention, it is believed the invention will be better understood from the following description taken in connection with the accompanying drawing, wherein:

The single FIGURE illustrates data on pore resolution as a function of pore diameter.

DESCRIPTION OF THE PREFERRED EMBODIMENT

The basic concept of this invention relates to the fact that at any time during an irradiation of fuel pellets undergoing fission in a nuclear reactor, the process of pore removal tends to decrease the outer dimensions of a fuel pellet. At the same time the separate process of swelling tends to increase the outer dimensions of a fuel pellet. If the pore removal process dominates, the pellet densifies. If the swelling process dominates, the pellet swells. Pellets prepared by the standard pressing and sintering techniques prevailing in the nuclear industry today contain quantities and size distributions of pores which support the observations mentioned above, namely densification early in life followed by swelling later in life.

In accordance with this invention, control over these densification and swelling properties will produce fuel pellets wherein dimensional changes can be held with definite and harmless limits. These data and knowledge in turn permit the choosing of fuel rods of the most efficient and economical design for use in reactors. This control over dimensional changes is achieved by proper adjustment of the quantity of each size of pores to obtain balance between the removal of pore volume and the increase in volume caused by the accumulation of fission product atoms. This concept represents a departure from the common understanding of the one for one replacement of any and all pores by swelling by noting that pores are removed at different rates according to their sizes as indicated by FIG. 1. Then by proper ajustment of the volume of pores of each size the rate of pore removal is matched to the rate of volume increase caused by fission product atom accumulation.

The basic concept of this invention can be applied to solid nuclear fuels of all types at all temperatures; except for common oxide, nitride, and carbide compounds of uranium and plutonium at fuel surface temperatures over about 1000° C. At temperatures above about 1000° C, fission gas swelling begins to influence the external dimensional behavior by increasing the swelling rate as a function of temperature. Below fuel surfce temperatures of approximately 1000° C, the swelling process that must be balanced by pore removal is essentially independent of temperature and is controlled by the solid state accumulation of fission product atoms. This solid state swelling process and values for its magnitude are well known in the art. The experimentally determined values for the magnitude of the solid state swelling rate range around the theoretically determined value of approximately 0.4 volume % per $10^{20}$ fissions per cm$^3$ of any solid nuclear fuel (or approximately 1 volume % per atom percent burnup of any oxide fuel). This solid state swelling rate is sufficiently accurate for the purposes of this disclosure and will be used in the further discussion of the concept.

The solid state swelling rate of 0.4 volume % per $10^{20}$ fissions per cm$^3$ is applicable to common oxide, nitride, and carbide compounds of uranium and plutonium at temperatures below about 1000° C regardless of all other factors such as size, shape, grain size, cladding material, etc. It is a fundamental rate constant. This constant is a linear function of burnup because it represents the accumulation of one extra atom for each fission event.

The rate of pore removal from less than fully dense nuclear fuels is not uniform, and can be controlled. No pores can be removed from a fully dense nuclear fuel; so that one degree of control is obviously obtained by adding porosity. This simple approach is the traditional approach to controlling swelling that was mentioned earlier. However, a second degree of control, which comprises the basis of this disclosure, is achieved by controlling the sizes of the pores that are added to the less than fully dense nuclear fuels.

The theory of pore removal is that empty pores in a solid can be regarded as second phase "particles" which are agglomerate of the unit voids in solids known as "vacancies". A "vacancy" will be understood as a point in the crystalline lattice of a solid where an atom is missing, a vacant site. The concept that a pore is an aggregation or agglomerate of vacancies is basic to an understanding of this invention. The concept might be stated differently by noting that each pore could be filled by a fixed number of atoms of the solid in appropriate crystalline array. This fixed number is equal to the number of vacancies that consitute the second phase "particle" or pore.

Upon understanding this concept of a pore as a second phase, the further development of the concept of pore removal requires a rather radical modification of the theory of "homogenization" of second phases under the influence of fission fragment bombardment. The phenomenon of "homogenization" was discovered in 1956 and has been modelled in considerable detail recently as the phenomenon known as "resolution". The theory of "homogenization" or "resolution" is based on the kinetic interaction of fission fragment atoms with the atoms of the second phase solid or gas. Such interaction is probably the first order effect responsible for homogenization of solid and gaseous second phases; but it is not possible for a kinetic interaction to take place between a fission fragment and a vacancy (which has no mass).

The resolution of pores is envisaged as taking place in the following manner. When a fission fragment is created, it enters the solid surrounding the fissioning atom with a kinetic energy of about 80 Mev. This kinetic energy is translated to the atoms of the solid, eventually effectively vaporizing all the atoms in a cylindrical volume 0.007 micron (1 micron = $10^{-6}$ meters) in diameter and 10 microns long. Atoms are driven in the direction of movement of the fission fragment leaving an unknown, but large, number of vacant lattice sites (vacancies) near the position of the fissioning atom. If a pore or second phase particle lies in the path of this fission fragment, it is partially or completely mixed with the vapor atoms of the matrix and partial or complete homogenization takes place. When the fission fragment finally comes to rest, a large number of excess matrix atoms which have been traveling with the fission fragment because of transference of kinetic energy also come to rest. When the vaporized region reforms as a solid, the crysal lattice is largely restored except that the lattice contains an excess of vacancies where the fission fragment started and an excess of interstitial matrix atoms where it came to rest; and the second phase pore or second phase particle in the path of the fission fragment is partially or completely homogenized.

At temperatures below about 1000° C in solid nuclear fuels of the ceramic type, solid second phase particles that have been homogenized cannot reconstitute or reform themselves because diffusion rates for impurity atoms are much too slow. However, there is adequate evidence that vacancies can diffuse over long distances in ceramic nuclear fuels at temperatures as low as 200° C. Thus, vacancies that have been homogenized from pores have a strong tendency to flow together to reform one or more pores. It is suspected that at very low fission rates this reformation of pores might predominate; but according to known data, it appears that an exposure of $10^{16}$ fissions per cm$^3$ every atom in a solid fissioning fuel has been involved in the volume of fuel vaporized by a fission fragment at least once. Thus, at typical fission rates of the order of $10^{13}$ fissions per cm$^3$ per second, the time allowed for pores to reform is $10^3$ seconds or about 17 minutes.

Thus, for pores of sizes near 0.007 micron in diameter, it would be expected that after an hour or two, the vacancies constituting such pores would be completely dispersed by being mixed several times with the matrix vapors created in the wake of several fission fragments. For pores of sizes much larger than 0.007 micron, after a period of several hours, it would be expected that there would be created around each residual pore a zone 10 to 20 microns in thickness in which there is a concentration gradient of vacancies increasing toward the residual pore. The outer limits of this zone are defined by the range of the fissioning atoms that occasionally drive extra atoms toward the residual pore leaving vacancies behind and tending to fill the pore. Therefore, pores much larger than 0.007 micron are filled by matrix atoms at rates proportional to the number of fissions per $cm^3$; and they are being reconstituted by the flow of vacancies into them in proportion to their surface area.

Since pores of sizes larger than about 0.1 micron constitute most of the volume of pores in as-fabricated ceramic fuels, and since such pores are usually found at distances of separation of less than 1 micron, it becomes obvious that after a few hours of irradiation, the matrix of a fuel that originally contained a variety of pore sizes will contain a fairly uniform supersaturation of vacancies. All the pores of sizes near 0.007 micron will be gone, pores of larger sizes will be disappearing at rates inversely related to their surface area, and vacancies will be flowing toward external surfaces, as well as other vacancy sinks, to reduce the size of all pores. To the extent that vacancies arrive at external surfaces, this process will cause densification of the fuel pellet.

Table 1 presents data on pore resolution as a function of pore diameter and burnup. It is assumed for the purposes of this disclosure that the time for removal of the volume of a pore is identical to the time required for resolution for all practical purposes. These data are plotted in FIG. 1. The times and the ordinates used in FIG. 1 are based on a typical fission rate of $10^{13}$ fissions per $cm^3$ per second.

TABLE I
PORE RESOLUTION DATA

| Pore Diameter Microns | Exposure Associated With Pore Removal Fissions per $cm^3$ | Time Associated With Exposure For Pore Removal at a Fission Rate of $10^{13}$ f/$cm^3$-sec., seconds |
|---|---|---|
| <$10^{-2}$ | $8 \times 10^{15}$ | $8 \times 10^2$ |
| 0.3 | $2 \times 10^{18}$ | $2 \times 10^5$ |
| 0.5 | $2 \times 10^{19}$ | $2 \times 10^6$ |
| 1.0 | $2 \times 10^{20}$ | $2 \times 10^7$ |
| 0.3 | $4.6 \times 10^{19}$ | $4.6 \times 10^6$ |
| 3.0 | $2.3 \times 10^{20}$ | $2.3 \times 10^7$ |
| 5.0 | $6.8 \times 10^{20}$ | $6.8 \times 10^7$ |
| 2.0 | $5 \times 10^{19}$ | $5 \times 10^6$ |
| 5.0 | $1.2 \times 10^{20}$ | $1.2 \times 10^7$ |
| 10 | $4 \times 10^{20}$ | $4 \times 10^7$ |

When a fuel pellet is fabricated by conventional pressing and sintering techniques to a typical final density of about 95% of theoretical density, the pore size distributions expressed in volumetric increments might be about as shown in Table 2. It should be understood that increases or decreases in the total porosity will cause corresponding increases or decreases in the volume of pores in each size range. The nature of conventional processes is such that changes in sintering procedures tend to affect the smaller sized pores more than the larger pores, whereas changes in the sizes of the powder particles and changes in the pressing procedures tend to affect the larger sized pores more than the smaller pores. Such process changes are possible, but are exercised primarily to result in minimum pellet production costs rather than to control the distribution of pore sizes in the product.

Using Table 2 and FIG. 1, it is seen that the 0.46% by volume of pores less than 0.7 microns in size will be eliminated by resolution in 150 to 300 hours.

TABLE 2
PORE DISTRIBUTIONS EXPRESSED AS PERCENT OF TOTAL VOLUME IN A TYPICAL PRESSED AND SINTERED PELLET PREPARED BY CONVENTIONAL TECHNIQUES

| Pore Size Range Microns | Pore Volume in Size Range Percent of Total Volume |
|---|---|
| 0.3 – 0.7 | 0.46 |
| 0.7 – 1.0 | 0.74 |
| 1 – 2 | 0.69 |
| 2 – 3 | 0.29 |
| 3 – 4 | 0.24 |
| 4 – 5 | 0.17 |
| 5 – 10 | 0.49 |
| 10 – 15 | 0.19 |
| 15 – 240 | 1.63 |
| 0 – 240 | 4.9 |

The 2.18% by volume of pores less than 3 microns in size will be eliminated in 1500 to 3000 hours. And the 1.63% by volume of pores larger than 15 microns will be only slightly affected at times less than approximately 10,000 hours.

The solid swelling rate of 0.4 volume percent per $10^{20}$ fissions per $cm^3$ may be used directly to derive columns 1, 2, and 3 of Table 3. Column 4 of Table 3 is obtained by use of column 3 and FIG. 1.

TABLE 3
DATA DERIVED FROM SWELLING RATE AND FIGURE 1

| Burnup Associated With Pore Removal $10^{20}$ Fissions per $cm^3$ | Solid Swelling Associated With Burnup Volume % | Time Associated With Burnup At $10^{13}$ f/$cm^3$ sec Seconds | Maximum Pore Size Removed At Burnup And Time Microns |
|---|---|---|---|
| 0.025 | 0.01 | $2.5 \times 10^5$ | 0.25 to 0.4 |
| 0.25 | 0.1 | $2.5 \times 10^6$ | 1.0 to 2.0 |
| 1.0 | 0.4 | $10^7$ | 2.5 to 4.0 |
| 2.5 | 1.0 | $2.5 \times 10^7$ | 5 to 7 |
| 5.0 | 2.0 | $5 \times 10^7$ | 7 to 12 |
| 7.5 | 3.0 | $7.5 \times 10^7$ | 10 to 15 |
| 10.0 | 4.0 | $10^8$ | 15 to 18 |
| 12.5 | 5.0 | $1.25 \times 0\ 10^8$ | 18 to 20 |

The data of Table 3 may be ued to derive the ideal specifications for the pore content of a nuclear fuel that will lead to a balance between the solid swelling rate of 0.4 volume percent per $10^{20}$ fissions per $cm^3$ and the volume of porosity that will be removed during each increment of burnup. Such an ideal specification is given in Table 4. A comparison of Table 2 with Table 4 shows that the new specification contains practically no pores less than 2 microns in size whereas a typical 95% dense sintered pellet contains about 2 volume percent of pores less than 2 microns in size. The new specification calls for 3 volume percent of porosity distributd mainly in the larger pore sizes between 2 and 15 microns in size, whereas a typical 95% dense sintered pellet contains less than 2 volume percent of pores distributed mainly in the smaller pore sizes. A recommended specification calls for 2 volume percent of porosity in the pore size range from 15 to 20 microns. This is approximately a ten-fold increase in the porosity found in typical sintered pellets in this size range.

TABLE 4

PORE DISTRIBUTIONS EXPRESSED AS PERCENT OF TOTAL VOLUME IN A NUCLEAR FUEL THAT WILL RESULT IN A BALANCE BETWEEN SWELLING AND PORE REMOVAL AT TEMPERATURES BELOW APPROXIMATELY 1000° C

| Pore Size Range Microns | Pore Volume in Size Range Percent of Total Volume |
|---|---|
| 0 – 2 | Less than 0.1 |
| 2 – 11 7 | ≈1 |
| 7 – 12 | ≈1 |
| 12 – 15 | ≈1 |
| 15 – 18 | ≈1 |
| 18 – 20 | ≈1 |
| 20 – 40 | Up to 5 |
| Over 40 | Not Specified |

The processes required for making the products described in this invention may be similar to those used in making molecular sieves except that whereas molecular sieves are produced with a fixed volume of one size of pore or pore size class (a class being a small range of pore sizes), the products described herein are produced in such a way that the final volumes of more than one size class of pores are controlled. This change from controlling the volume of only one size class of pore to controlling the volumes of several size classes of pores simultaneously involves fabricating materials by sintering.

The procedure to be used for producing sintered materials with the specified pore size distributions will depend somewhat upon the nature of the raw material; but an example of a procedure to produce pellets of nuclear fuel with less than 0.1% of porosity in pore sizes below 2 microns in diameter, with 1% of porosity in each of the five pore size groups 2 to 7 microns, 7 to 12 microns, 12 to 15 microns, 15 to 18 microns, and 18 to 20 microns, and up to 5% of porosity in the size group from 20 to 40 microns from a raw material consisting of a very fine, chemically precipitated powder is as follows:

Step 1

Agglomerate the powder into aggregates that have a mean aggregate diameter of approximately 250 microns (60 mesh). Screen out and recycle all aggregates smaller than 90 microns (minus 10 mesh) or larger than 400 microns (plus 40 mesh). Agglomeration can be accomplished by passing the powder through a rotating tube mill inclined at a slight angle. A trace of a binder such as paraffin may be required to produce such large aggregates. An alternate procedure is to consolidate the powder by passing it through rolls to produce a crude, green-pressed cake that can be broken up and screened.

STEP 2

Consolidate the aggregates by melting or sintering into essentially 100% dense, and probably nearly spherical, particles. This operation can be performed by dropping the aggregates through an inert gas plasma at a temperature of 2000° to 2600° C. The residence time at temperature should be adjusted to remove essentially all pores less than 5 microns in diameter from the product. Plasmas of this type can be obtained in induction coils, in electric arcs, and in electron guns.

STEP 3

Screen the fuel particles obtained from the previous step. Reject and recycle all particles smaller than 70 microns (minus 200 mesh) or larger than 500 microns (plus 35 mesh). Separate the particles into six fractions corresponding to sizes from 70 to 125 microns, 125 microns to 170 microns, 170 microns to 210 microns, 210 microns to 250 microns, 250 microns to 300 microns, and 300 to 500 microns.

STEP 4

If a 95% dense product is desired, the above specification will allow only the 5% porosity in the size fractions between 2 micron diameter pores and 20 microns. To make such a 95% dense product, combine equal weights of powders in the five smaller size fractions from the above step. (If a 94% dense product is desired, add a weight of the largest size fraction equal to the weight of one of the smaller size fractions, etc.)

STEP 5

Mix the above powders thoroughly with about 1 to 2% of a binder, cold press at a pressure of the order of 40,000 psi to produce a green pressed pellet of the desired shape, and sinter (if $UO_2$) in dry hydrogen for 8 hours at 1750° C. If the product is not 95% dense, sinter at lower temperatures to decrease density and at higher temperatures to increase density. If the product contains pores that are too small, then the particle sizes of the appropriate fractions of the agglomerates and dense particles should be increased, and vice versa.

The product described above will contain no less than three and up to nine separate alloying constituents or additives. Because most of thee constituents are pores which have no mass, the amounts of the constituents are specified below by volume percent.

| Constituents No. | Description of Constituent | Allowable Range of Vol. Percent |
|---|---|---|
| 1 | Pores whose diameters are in the range 0 to 2 microns | 0 to 1 |
| 2 | Pores whose diameters are in the range 2 to 7 microns | 0 to 2 |
| 1 plus 2 | Pores whose diameters are in the range 0 to 7 microns | 0 to 2 |
| 3 | Pores whose diameters are in the range 7 to 12 microns | 0 to 2 |
| 1 plus 2 plus 3 | Pores whose diameters are in the range 0 to 12 microns | 1 to 3 |
| 4 | Pores whose diameters are in the range 12 to 15 microns | 0 to 2 |
| 1, 2, 3, and 4 | Pores whose diameters are in the range 0 to 15 microns | 2 to 4 |
| 5 | Pores whose diameters are in the range 15 to 18 microns | 0 to 2 |
| 1, 2, 3, 4 and 5 | Pores whose diameters are in the range 0 to 18 microns | 3 to 5 |
| 6 | Pores whose diameters are in the range of 18 to 20 microns | 0 to 2 |
| 1, 2, 3, 4, 5 and 6 | Pores whose diameters are in the range of 0 to 20 microns | 4 to 6 |
| 7 | Pores whose diameters are in the range of 20 to 40 microns | 0 to 5 |
| 8 | Pores whose diameters are more than 40 microns | Not specified |
| 9 | Dioxide of uranium and plutonium | Balance |

The ideal volumes of these constituents are listed in Table 4 above. The most critical constituents from the standpoint of achieving the desired balance between the rate of pore removal and the rate of swelling are in order of importance constituents 1, 2, and 3.

Examples of products described by this invention are listed below. These examples illustrate various features of the invention and are not intended to limit the scope of the invention. A critical feature relating to scope of the invention is that each product covered involves a specification of the volume of more than one size class of pores. Stated differently, each product covered by this invention must consist of Constituent No. 9 plus at least two other constituents beginning with Constituent No. 1 and proceeding through the list in order to Constituent No. 7 while remaining within the allowable limits. Constituent No. 8 may not be counted as one of the two other constituents, but functions primarily to reduce the volume percentage of Constituent No. 9.

EXAMPLE 1

An alloy having a density of 10.73 grams per cubic centimeter (98% of the maximum theoretical density) consisting of uranium dioxide (Constituent No. 9) plus 1 volume percent of pores less than 7 microns in diameter (Constituents Nos. 1 and 2 combined) plus 1 volume percent of pores whose diameters are between 7 and 15 microns (Constituents 1, 2, 3, and 4 combined).

EXAMPLE 2

An alloy having a density of 10.62 grams per cubic centimeter (97% of the maximum theoretical density) consisting of uranium dioxide (Constituent No. 9) plus 0.1 volume percent of pores less than 2 microns in diameter (Constituent No. 1) plus 1.0 volume percent of pores between 2 and 7 microns in diameter (Constituent No. 2) plus 1.2 volume percent of pores between 7 and 12 microns in diameter (Constituent No. 3) plus 0.7 volume percent of pores between 12 and 18 microns in diameter (Constituents No. 1, 2, 3, 4 and 5 combined).

EXAMPLE 3

An alloy having a density of 10.40 grams per cubic centimeter (95% of the maximum theoretical density) consisting of uranium dioxide (Constituent No. 9) plus 0.2 volume percent of pores less than 2 microns in diameter (Constituent No. 1) plus 1.0 volume percent of pores between 2 and 7 microns in diameter (Constituent No. 2) plus 1.5 volume percent of pores between 7 and 12 microns in diameter (Constituent No. 3) plus 1.0 volume percent of pores between 12 and 15 microns in diameter (Constituent No. 4) plus 0.5 volume percent of pores between 15 and 18 microns in diameter (Constituent No. 5) plus 0.3 volume percent of pores between 18 and 20 microns in diameter (Constituent No. 6) plus 0.2 volume percent of pores between 20 and 40 microns (Constituent No. 7) plus 0.3 volume percent of pores larger than 40 microns (Constituent No. 8).

EXAMPLE 4

An alloy having a density of 10.07 grams per cubic centimeter (92% of the maximum theoretical density) consisting of uranium dioxide (Constituent No. 9) plus 0.2 volume percent of pores less than 2 microns in diameter (Constituent No. 1) plus 1.5 volume percent of pores between 2 and 7 microns in diameter (Constituent No. 2) plus 1.2 volume percent of pores between 7 and 12 microns in diameter (Constituent No. 3) plus 1.0 volume percent of pores between 12 and 15 microns in diameter (Constituent No. 4 plus 1.0 volume percent of pores between 15 and 18 microns in diameter (Constituent No. 5) plus 0.8 volume percent of pores between 18 and 20 microns in diameter (Constituent No. 6) plus 1.0 volume percent of pores between 20 and 40 microns in diameter (Constituent No. 7) plus 1.3 volume percent of pores larger than 40 microns (Constituent No. 8).

Table 4 shows the pore size distribution which will result in an optimum balance between swelling and pore removal. Since this distribution represents an ideal distribution, it is possible to vary from the percentages given and still stay within reasonable and harmless limits with regard to pore removal and swelling.

A reasonable basis for these variances is the fact that a deviation of approximately 1 volume percent of either swelling or densification can usually be tolerated. Thus, the specification of Table 4 is basic plus any pore size distribution in which the pore volume in any group is as much as 1 volume percent, more or less, than the specification given in Table 4, provided that the sum of the pore volumes in all groups up to 7 microns is not more than 2 volume percent, and provided that the sum of the pore volumes in all groups up to 12 microns is not more than 3 volume percent nor less than 1 volume percent, and provided that the sum of the pore volumes in all groups up to 15 microns is not more than 4 volume percent nor less than 2 volume percent, and provided that the sum of the pore volumes in all groups up to 18 microns is not more than 5 volume percent nor less than 3 volume percent, and provided that the sum of the pore volumes in all groups up to 20 microns is not more than 6 volume percent nor less than 4 volume percent.

Non-standard fabrication procedures are used to prepare fuel pellets meeting the above specifications. In particular, the above specifications can be met by sintering pellets from powder particles that themselves contain no pores less than 2 microns in diameter. Such powders might consist of particles ranging in size from about 2 microns in diameter to about 50 microns in diameter. Such dense particles may be obtained by passing agglomerates of smaller particles through a plasma or other heating device at a temperature of 2000° to 2600° C. Consolidation and sintering of these dense particles could be done by techniques common to the industry; however, it might be necessary to further remove entrapped fine pores by increasing sintering times and temperatures.

The advantages of a nuclear fuel that neither increases or decreases its outer dimensions by swelling or densification in a nuclear reactor are obvious to anyone familiar with the design of nuclear devices. Swelling places strains on the cladding that may cause the cladding to fail, thereupon releasing radioactivity to the coolant. Densification causes voids in the fuel column that may cause reactivity changes, heat transfer problems, or cladding collapses; all of which have adverse affects on reactor operations. A fuel pellet fabricated according to this invention will show volume changes of less than plus or minus one percent which represents a major advance in the art.

It will be apparent that many modifications and variations are possible in light of the above examples. It therefore is to be understood that within the scope of the appended claims, the invention may be practiced other than as specifically described.

I claim:

1. A nuclear fuel pellet for use in a nuclear reactor, said fuel pellet consisting essentially of uranium dioxide and plutonium dioxide and having pores therein randomly distributed to provide a balance between pellet swelling and pore removal at a plurality of temperatures less than 1000° C, said pores being less than 1 percent of the total pellet volume for pore sizes less than 2 microns, and up to 6 percent of total pellet volumes for pore sizes between 0 microns and about 20 microns.

2. The pellet according to claim 1 wherein the pore sizes between 0 and 20 microns includes pores whose diameter are (a) in the range of 2 to 7 microns and constitutes up to two percent of total pellet volume, (b) in the range of 7 to 12 microns and constitutes up to two percent of total pellet volume, and (c) in the range of 2 to 12 microns and constitutes 1 to 3 percent of total volume.

3. The pellet according to claim 2 wherein the pore sizes between 0 and 20 microns includes pores whose diameter ranges between 2 and 15 microns, constitutes 2 to 4 percent of total pellet volume.

4. The pellet according to claim 3 wherein the pore sizes between 2 and 40 microns includes pores whose diameter ranges between 15 and 20 microns constitutes 1 to 3 percent of total pellet volume.

5. The pellet according to claim 1 wherein the pore sizes between 2 and 40 microns includes pore size groups 2 to 7 microns, 7 to 12 microns, 12 to 15 microns, 15 to 18 microns, and 18 to 20 microns, with 1 percent porosity in each of said pore size groups.

6. The pellet according to claim 5 which further includes a pore size of 20 to 40 microns, which group alone constitutes up to 5 percent of total pellet volume.

7. The pellet according to claim 5 wherein the pore volumes in all the pore size groups up to 20 microns is no more than 6 volume percent nor less than 4 volume percent.

* * * * *